United States Patent [19]

Ishigaki et al.

[11] 4,016,373
[45] Apr. 5, 1977

[54] MULTICHANNEL RECORD DISC RECORDING SYSTEM

[75] Inventors: Yukinobu Ishigaki, Yamato; Isao Ohwaki, Tokyo; Masahiro Ohba, Yokohama, all of Japan

[73] Assignee: Victor Company of Japan, Limited, Yokohama, Japan

[22] Filed: Sept. 25, 1975

[21] Appl. No.: 616,876

[30] Foreign Application Priority Data

Sept. 26, 1974 Japan .................... 49-109944
July 4, 1975 Japan .................... 50-81767

[52] U.S. Cl. .............. 179/100.4 ST; 179/1 GQ; 179/1 P; 179/15 BT; 179/100.4 M
[51] Int. Cl.² .............................. G11B 3/00
[58] Field of Search .......... 179/100.4 ST, 1 G, 1 P, 179/1 GQ, 100.1 TD, 15 BT, 100.4 M; 178/6.6 R; 329/122

[56] References Cited

UNITED STATES PATENTS

| | | | |
|---|---|---|---|
| 3,686,471 | 8/1972 | Takahashi | 179/100.4 ST |
| 3,772,479 | 11/1973 | Hilbert | 179/1 GQ |
| 3,883,699 | 5/1975 | Takahashi | 179/100.4 ST |
| 3,934,087 | 1/1976 | Takahashi et al. | 179/100.4 ST |

*Primary Examiner*—Daryl W. Cook

[57] ABSTRACT

A multichannel record disc recording system comprises circuits for forming first and second sum signals and first and second difference signals respectively from signals of two different channels of four channels. The first and second difference signals, are angle modulated and, a control signal is formed in accordance with the level of at least one of the first and second sum signals and the level of at least one of the first and second difference signals. The levels of the first and second angle-modulated signals are controlled in accordance with the control signals thus formed. Circuits are provided for multiplexing the first sum signal and the first angle-modulated difference signal thus level controlled, and for multiplexing the second sum signal and the second angle-modulated difference signal thus level controlled. These multiplexed signals are then recorded on a record disc. The control signal forming circuit forms a control signal when the level of at least one of the first and second sum signals is higher than a first specific level and when it is lower than a second specific level, which is lower than the first specific level. The control signal forming circuit, detects a condition wherein the levels of the first and second sum signals are lower than the second specific level which is lower than the first specific level. Moreover, a control signal is formed when the levels of the first and second difference signals are lower than a third relatively low specific level.

6 Claims, 22 Drawing Figures

MULTICHANNEL RECORD DISC RECORDING SYSTEM

BACKGROUND OF THE INVENTION

The present invention relates generally to multichannel record disc recording systems with level control. More particularly, the system superimposes a direct-wave signal and an angle-modulated wave signal and records the same on a record disc. The automatically controlled level of the angle-modulated wave signal increases when the level of the direct-wave signal exceeds a specific level and when it becomes less than another specific level or becomes zero.

The 4-channel record disc recording system is described in U.S. Pat. Nos. 3,686,471 and 3,883,699. Signals from two channels are matrixed, to obtain, respectively, sum and difference signals. Then, a carrier wave is angle modulated responsive to the difference signal. The resulting angle-modulated difference signal is multiplexed with a direct wave sum signal, and the signal thus multiplexed is recorded on the record disc.

If the levels of the respective channel signals are high, interference will readily occur between the high-frequency band component of the direct wave sum signal and the angle-modulated wave difference signal. This interference occurs at the time of recording of the 4-channel record disc and at the time of reproducing by means of a pickup cartridge. In such a case, the interference will give rise to various problems such as disturbance noise, impairment of the S/N ratio, and deterioration of the distortion factor.

Accordingly, one conceivable measure for preventing the occurrence of these adverse effects is to maintain the angle-modulated wave difference signal always at a high level. However, when the level of the angle-modulated wave difference signal is always maintained at a high value, the recording cutter head generates heat. This heat, in turn, requires a special gas cooling means of an elaborate scale and high cost.

Accordingly, a system intended to solve the above described problems has been disclosed in U.S. Pat. No. 3,806,667, entitled FOUR CHANNEL PHONOGRAPH MULTIPLEX RECORDING SYSTEM WITH SIGNAL LEVEL CONTROL. In this system, a device is used for reproducing a magnetic tape on which are recorded program signals which are to be recorded on the disc. An auxiliary head is provided ahead or upstream of the regular reproducing head, as viewed in the tape traveling direction. A signal reproduced by this upstream head is passed through circuits such as an equalizer circuit, a gate circuit, a delay circuit, and an integration circuit, thereby to obtain a control signal which varies in accordance with the level of the reproduced signal. By this control signal, the level of the angle-modulated wave difference signal is automatically controlled.

In this system, however, separate transmission lines are used for the 4-channel signals reproduced through the regular reproducing line and for the control signal obtained by reproduction through the upstream auxiliary head. For this reason, it is necessary to readjust to the level of the control signal when the signal level (cutting level) is set in the 4-channel signal transmission system. Furthermore, in this previous system, the upstream auxiliary head must be provided, and the magnetic tape reproducing device becomes complicated. In addition, there are problems resulting from the complicated nature of the control signal circuit, the large and elaborate scale of the disc cutting apparatus, and the troublesome need for making adjustments.

Accordingly, with the aim of solving these problems, a system has been described in a copending U.S. patent application, Ser. No. 589,557, entitled MULTICHANNEL RECORD DISC RECORDING SYSTEM WITH SIGNAL LEVEL CONTROL. In this system, control causes the level of the angle-modulated wave difference signal to become high when the level of the direct-wave sum signal becomes higher than a specific level. By this provision, interference between the direct-wave sum signal and the angle-modulated wave difference signal is reduced.

However, if the levels of all channel signals are very low, or when there are no signals, there is a decrease in the S/N ratio of the demodulation system for the angle-modulated wave signal.

SUMMARY OF THE INVENTION

Accordingly, it is a general object of the present invention to provide a novel and useful multichannel record disc recording system with signal level control in which the above described problems have been solved.

Another and more specific object of the invention is to provide a level control in a system wherein a direct-wave signal and an angle-modulated wave signal are multiplexed and recorded on a record disc. The system controls the level of the angle-modulated wave signal in a manner which increases this signal level when the level of the direct-wave signal is higher than a first specific level and when it is lower (including the case where it is zero) than a second specific level, which is lower than the first specific level. At the time of reproduction, a multichannel disc recorded by the system of the present invention, has no interference between the high-frequency component of the direct wave signal and the angle-modulated wave difference signal. Deleterious effects, such as a lowering of the S/N ratio and a deterioration of the distortion factor characteristic due to disturbance noise, do not occur.

Particularly, when the levels of the channel signals to be recorded are very low or zero, the noise is reduced in the demodulation system for the angle-modulated wave signal, and a large S/N ratio is attained, since the ratio of the carrier level to the noise level has been increased.

Still another object of the invention is to provide a system of the above stated character, which increases the level of the angle-modulated wave signal when the level of the direct-wave signal becomes higher than a first specific level, and also increases the level of the angle-modulated wave signal when the level of the direct-wave signal is lower than a second specific level and simultaneously the modulation signal is of a level which either is lower than a specific level or does not exist. The system multiplexes and records on a record disc this direct-wave signal and the level-controlled, angle modulated signal.

Other objects and further features of the invention will be apparent from the following detailed description when read in conjunction with the accompanying drawings.

BRIEF DESCRIPTION OF THE DRAWINGS

In the drawings:

FIGS. 3(A) through 3(L) are time charts respectively indicating signal waveforms appearing at various parts of the block diagram in FIG. 2;

FIGS. 6(A) through 6(F) are time charts respectively indicating waveforms at various parts of the circuit diagram in FIG. 5.

DETAILED DESCRIPTION

Figure 1:
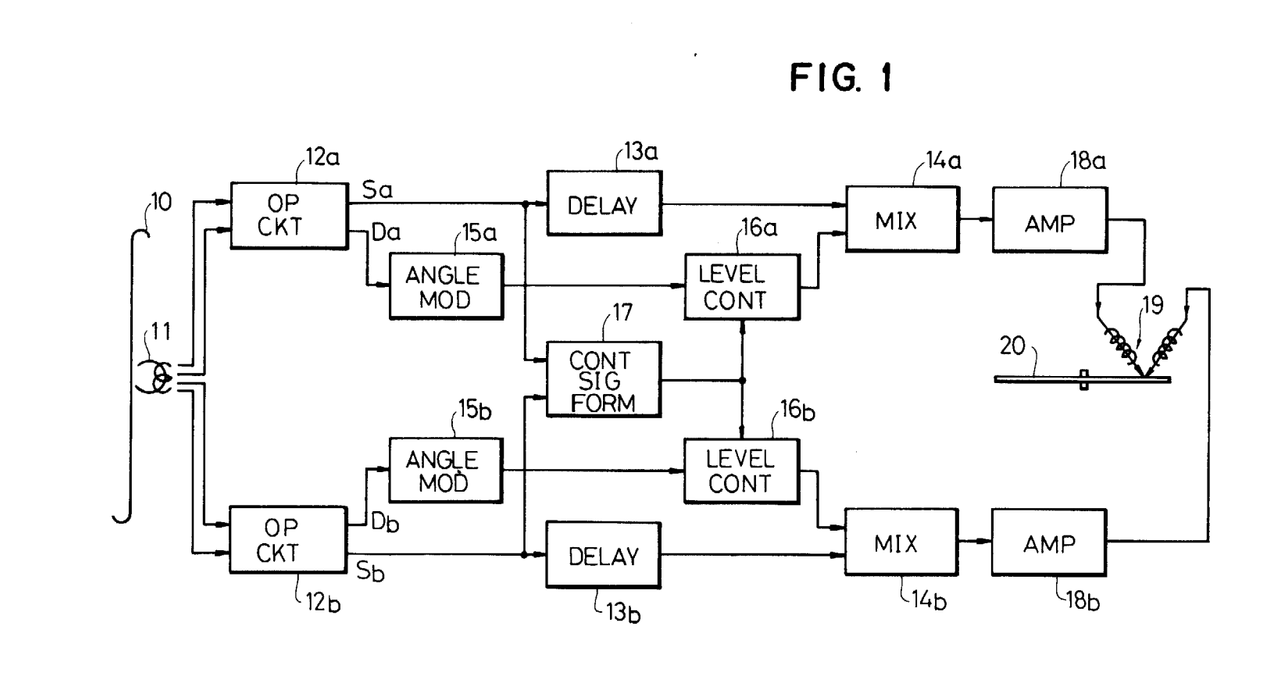
FIG. 1 is a block schematic diagram showing of one embodiment of a multichannel record disc recording system according to the invention.

One embodiment of the multichannel record disc recording system of the invention will first be described with reference to FIG. 1, which is a simplified block diagram thereof. On a magnetic tape 10, signals CH1 through CH4 of first through fourth channels are recorded on four separate tracks. Each channel signal is reproduced by a reproducing head block 11. The reproduced first and second channel signals CH1 and CH2 are supplied to an operation circuit 12a, while the reproduced third and fourth channel signals CH3 and CH4 are supplied to an operation circuit 12b.

An output sum signal Sa(CH1 + CH2) of the operation circuit 12a passes through a delay circuit 13a to a mixer 14a. An output difference signal Da(CH1 − CH2) is angle modulated by an angle modulator 15a to a level control circuit 16a.

Similarly, an output sum signal Sb(CH3 + CH4) of the operation circuit 12b passes through a delay circuit 13b to a mixer 14b. An output difference signal Db(CH3 − CH4) is angle modulated by an angle modulator 15b to a level control circuit 16b.

On the other hand, the output sum signals Sa and Sb of the operation circuits 12a and 12b are simultaneously supplied to a control signal forming circuit 17. There, a control signal is formed as described hereinafter. The resulting control signal thus formed by the control signal forming circuit 17 is applied on the level control circuits 16a and 16b. Simultaneously, the control signal controls the level of the angle-modulated difference signals supplied from the angle modulators 15a and 15b. These level controlled, angle-modulated difference signals are respectively supplied to the mixers 14a and 14b and are respectively mixed and multiplexed with the direct wave sum signals Sa and Sb which have passed through the delay circuits 13a and 13b.

The resulting multiplexed signals, produced as output from the mixers 14a and 14b are respectively amplified by amplifiers 18a and 18b. Then, they are supplied respectively to the driving coils of the left and right channels of a cutter head 19. These two signals are cut and recorded respectively on the left and right walls of the same groove on a disc 20.

Figure 2:
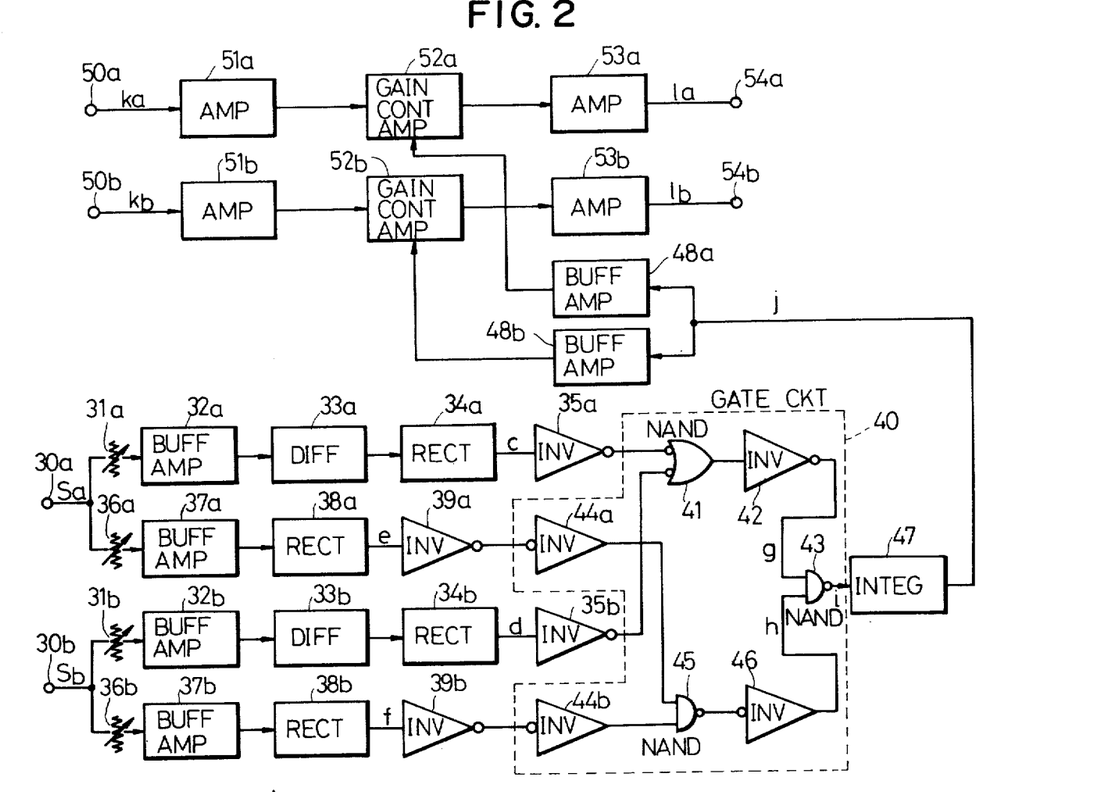
FIG. 2 is a block schematic diagram showing one embodiment of an essential part of the system illustrated in FIG. 1.

One embodiment of the control signal forming circuit 17 and the level control circuits 16a and 16b will now be described with reference to the block diagram of FIG. 2.

Figure 3:
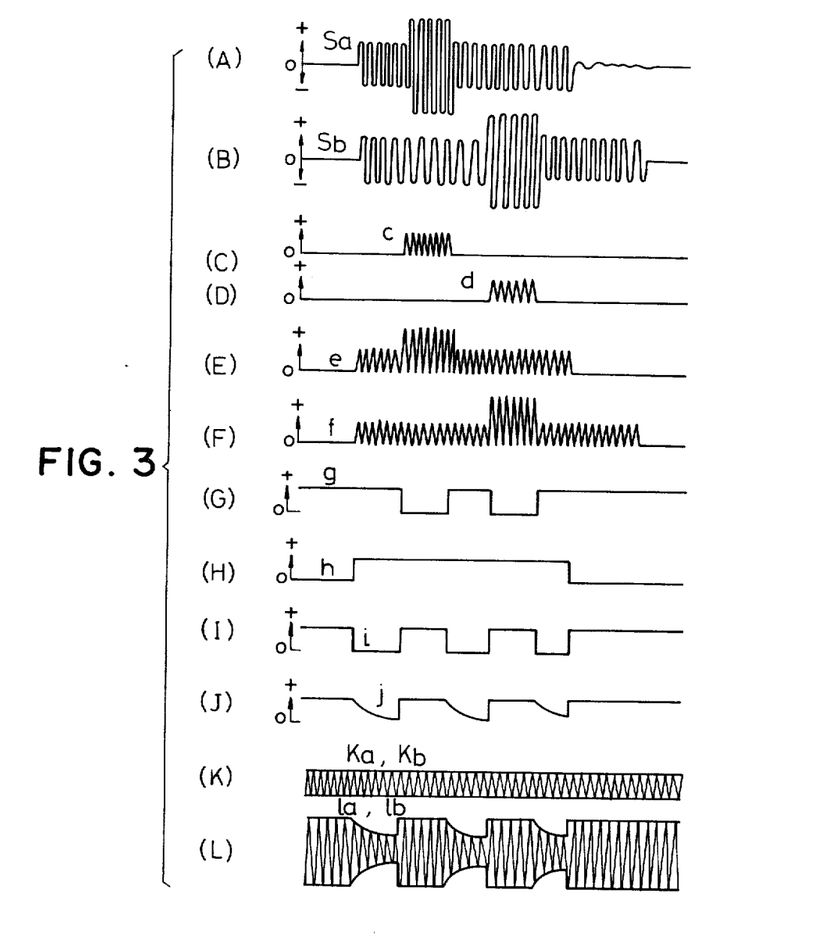

The sum signals Sa and Sb of the waveforms indicated in FIGS. 3(A) and 3(B) enter input terminals 30a and 30b from the operation circuits 12a and 12b. On the one hand, these signals are passed respectively through variable resistors 31a and 31b, by which their levels are set. These signals are then passed through buffer amplifiers 32a and 32b and thereafter supplied to differentiation circuits 33a and 33b, which extract only their high-frequency band components. The signals thus passing through the differentiation circuits 33a and 33b are subjected to envelope detection by rectification circuits 34a and 34b, and signals c and d are derived, as indicated in FIGS. 3(C) and 3(D). These signals C and d exist when the levels of particularly the high-frequency band components of the input signal Sa and Sb are higher than the first specific level.

On the other hand, the sum signals Sa and Sb, which have entered through the input terminals 30a and 30b, are passed respectively through variable resistors 36a and 36b which set their levels. These signals are then passed through buffer amplifiers 37a and 37b and thereafter supplied to rectification circuits 38a and 38b, where the signals are subjected to envelope detection. As a result, signals e and f are derived from the rectification circuits 38a and 38b, as indicated in FIGS. 3(E) and 3(F). The signals e and f occur during periods when the input signals Sa and Sb have signal levels which are higher than a second specific level. That second level is very much lower than the above mentioned first specific level.

The above mentioned signals c and d from the rectification circuits 34a and 34b are inverted in polarity and wave shaped by inverter and wave-shaping circuits 35a. Thereafter, they 35b and are fed respectively to a NAND gate 41 in a gate circuit 40. The resulting output of the NAND gate 41 is inverted in polarity by an inverter 42. As indicated in FIG. 3(G) it, is then fed to one of the input terminals of a NAND gate 43, with a low level. These signals are fed during the periods when at least one of the levels of the high frequency band components of the signals Sa and Sb is higher than the first specific level. During other periods, these signals have a high level rectangular wave signal g.

The signals e and f from the rectification circuits 38a and 38b are inverted in polarity and wave shaped by inverter and wave-shaping circuits 39a and 39b. Thereafter, they are returned to their original polarities by the inverters 34a and 34b, respectively. Then, they are fed respectively to a NAND gate 45. The output signal of the NAND gate 45 is inverted in polarity by an inverter 46 and, as indicated in FIG. 3(H), is fed to the other input terminal of the NAND gate 43 at a low level in the period wherein the level of at least one of the input signals Sa and Sb is lower than the above mentioned second level and as rectangular wave signal h of high level in other periods.

As indicated in FIG. 3(I), a signal of low level is obtained from the NAND gate 43 only during the period while both of the signals g and h are of a high level. A high level signal i, of rectangular waveform, is obtained in the other periods, as indicated in FIG. 3(I). Consequently, a rectangular wave signal i, of a high level, is obtained from the gate circuit 40 during the period while the level of at least one of the input signals Sa and Sb is lower than the above mentioned second specific level, and during the period while the level of the high-frequency band component of at least one of the signals is higher than the above mentioned first specific level.

An integration circuit 47 converts the output signal $i$ of the gate circuit 40 into a control signal $j$, of a waveform as indicated in FIG. 3(J). Circuit 47 has a specific time constant. This control signal $J$ is passed through buffer amplifiers 48a and 48b and applied to voltage controlled variable gain amplifiers 52a and 52b. To these variable gain amplifiers 52a and 52b, angle-modulated difference signals K$a$ and K$b$ (FIG. 3(K)) are being fed from the angle modulators 15a and 15b by way of input terminals 50a and 50b and amplifiers 51a and 51b. These angle-modulated difference signals K$a$ and K$b$ are respectively level controlled in the variable gain amplifiers 52a and 52b, responsive to the above mentioned control signal $j$. As a consequence, from the variable gain amplifiers 52a and 52b, angle-modulated difference signals 1$a$ and 1$b$ are obtained and supplied through amplifiers 53a and 53b and output terminals 54a and 54b to the mixers 14a and 14b. Signals 1$a$ and 1$b$ have levels which have been controlled as indicated in FIG. 3(L).

Here, the levels of the angle-modulated wave difference signals 1a and 1b are so controlled that their levels will be high during the period while the levels of the high-frequency band component of the direct-wave sum signals S$a$ and S$b$ are higher than the above-mentioned first specific level and also during the period while the levels of the high-frequency band component of the direct-wave sum signals S$a$ and S$b$ are lower than the above mentioned second specific level.

In the above described embodiment (FIG. 3(L)), the levels of the signals 1a and 1b rise steeply to a high level when the level of the sum signal S$a$ (S$b$) becomes very low or becomes virtually zero. However, when the level rises abruptly in this manner, there is a possibility of generation of abnormal noise.

Furthermore, in the demodulation system for angle-modulated wave signals, audible noise is generated when the level of the modulation signal is very low or is zero. Accordingly, it is desirable to increase the level of the angle-modulated wave signal when the level of the modulation signal is very low or zero.

Figure 4:
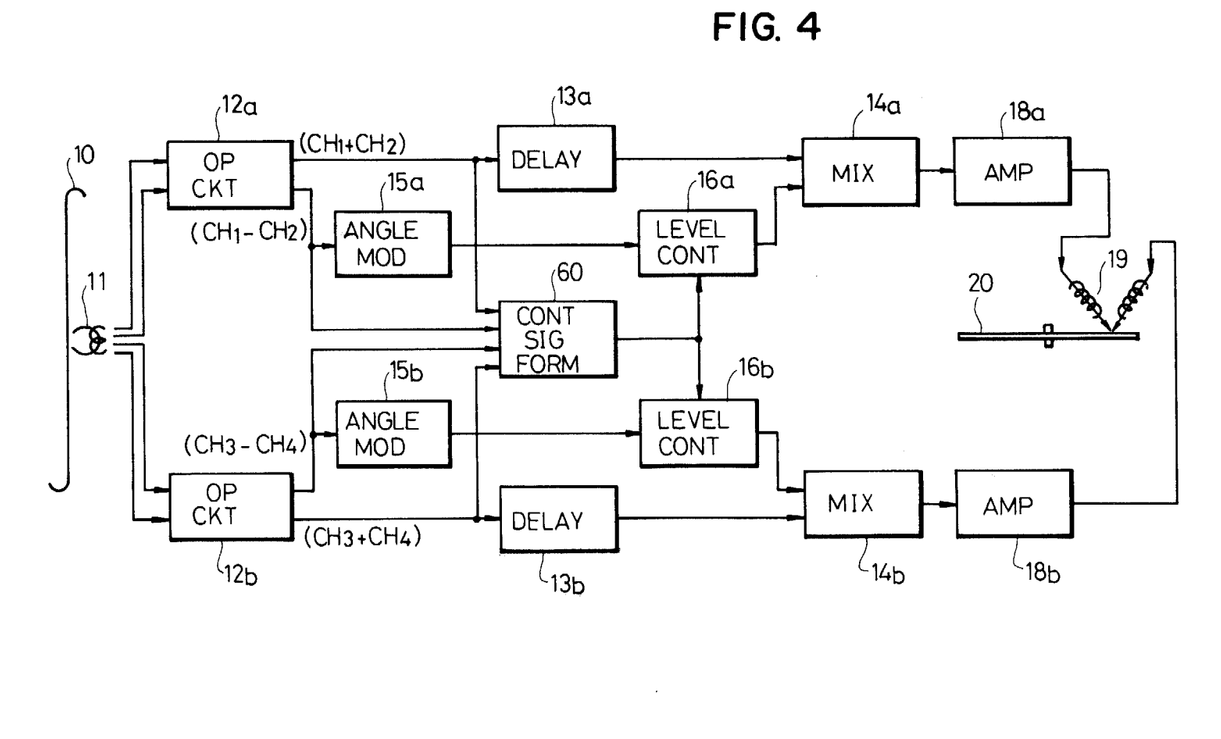
FIG. 4 is a block diagram showing another embodiment of a multichannel record disc recording system according to the invention.
Figure 5:
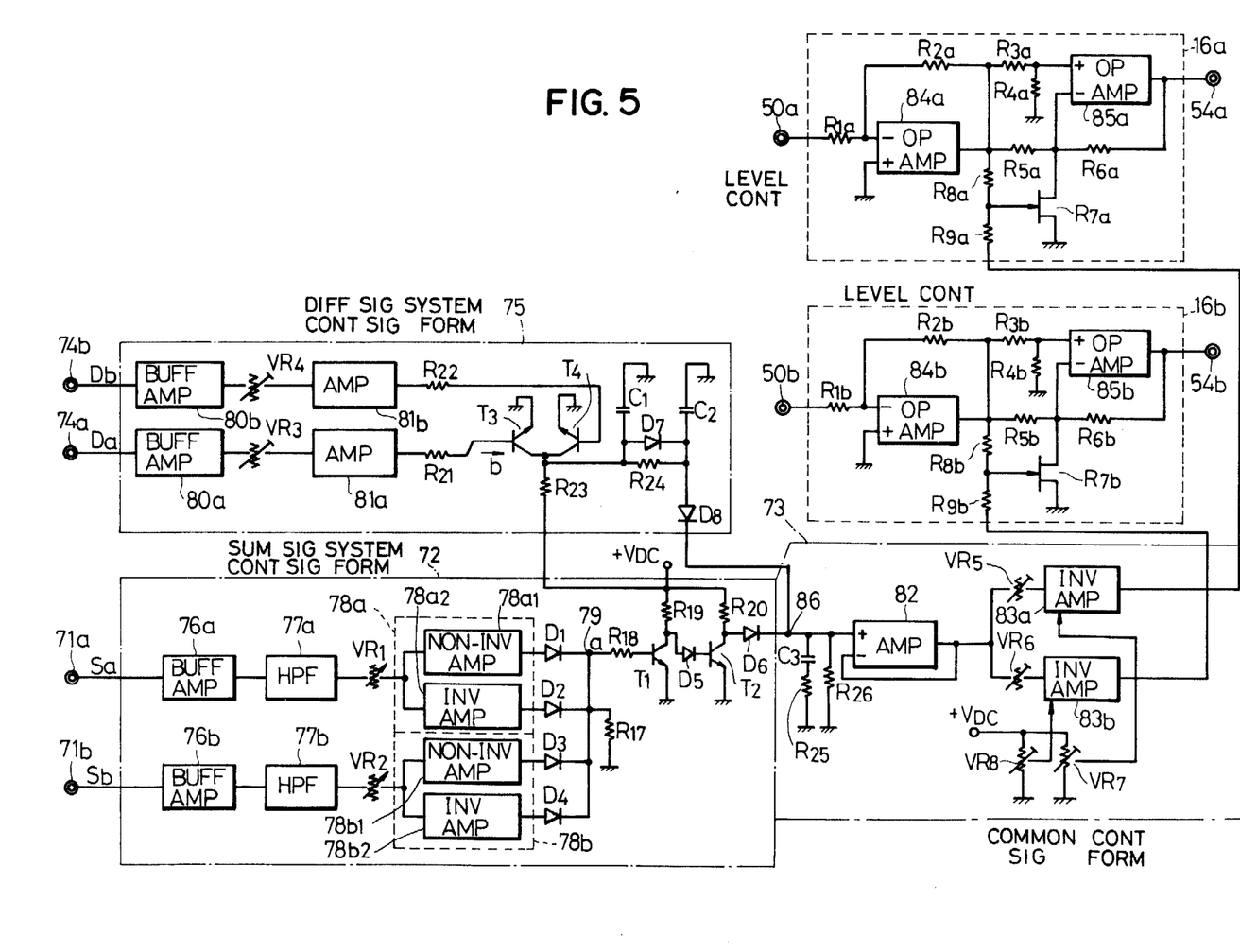
FIG. 5 is a circuit diagram showing one embodiment of a specific circuit which is an essential part of the block diagram shown in FIG. 4.
Figure 6:
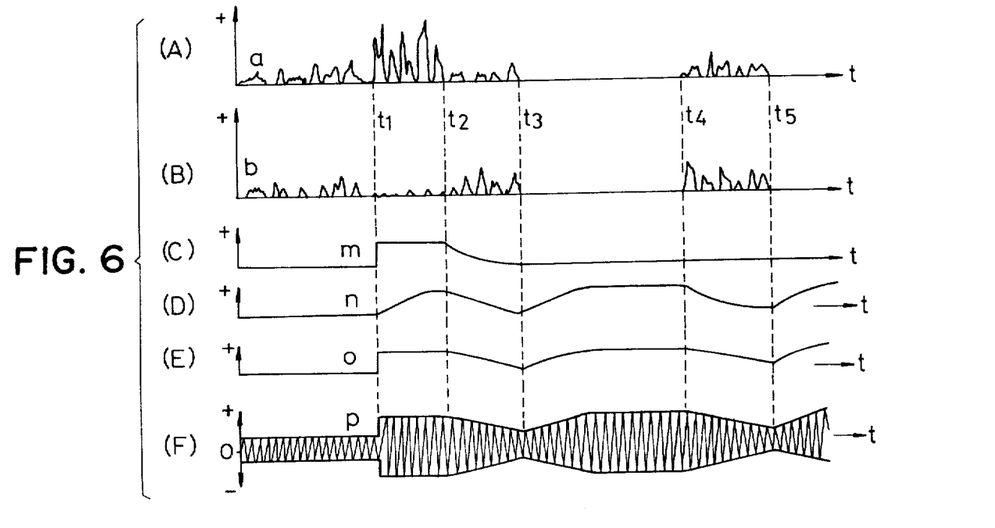

FIGS. 4–6 show a second embodiment of the system, according to the present invention. In FIG. 4, those parts which are the same as corresponding parts in FIG. 1 are designated by like reference numerals. A detailed description of these parts will be omitted.

A control signal forming circuit 60 is supplied respectively with sum signals S$a$ and S$b$ and difference signals D$a$ and D$b$ from the operation circuits 12a and 12b. Circuit 60 forms control signals as described hereinafter. The level control circuits 16a and 16b are supplied with the control signals, from the control signal forming circuit 60, which control the levels of the angle-modulated wave difference signals which are provided by the angle modulators 15a and 15b.

One embodiment of a specific control signal forming circuit 60 and the level control circuits 16a and 16b will now be described with reference to FIG. 5.

Sum signals S$a$ and S$b$, from the operation circuits 12a and 12b, are introduced through input terminals 71a and 71b and are supplied to a sum signal system control signal forming circuit 72. In circuit 72, these signals pass through buffer amplifiers 76a and 76b to the high-pass filters 77a and 77b. The levels of the high-frequency band components of the sum signals, thus derived from the high-pass filters 77a and 77b, are set by variable resistors VR1 and VR2. These components are thereafter amplified respectively in amplification circuits 78a and 78b which are noninverting amplifiers 78$a_1$ and 78$b_1$ and inverting amplifiers 78$a_2$ and 78$b_2$. The output signals of these amplification circuits 78a and 78b are fed to diodes D1, D2, D3, and D4, where only positive signal components are led out. As a consequence, a signal $a$ of a waveform (FIG. 6(A)) appears at a common junction 79 of the cathodes of the diodes D1 through D4.

The variable resistors R1 and R2 set the threshold level of the signal passing through the diodes D1 through D4. The signal $a$ at the junction 79 is passed through a waveform shaping circuit comprising transistors T1 and T2, resistors R19 and R20, and a diode D5 and a gate diode D6, to a common control signal forming circuit 73.

The difference signals D$a$ and D$b$, arriving from the operation circuits 12a and 12b, enter through input terminals 74a and 74b and are supplied to a difference signal system control signal forming circuit 75. In this circuit 75, these difference signals D$a$ and D$b$ pass through buffer amplifiers 80a and 80b. Their level is set by variable resistors VR3 and VR4, at a threshold level. It is amplified in high gain amplifiers 81a and 81b, and passed through resistors R21 and R22, to the bases of transistors T3 and T4, for gating and wave shaping. Through the bases of these transistors T3 and T4, a signal current $b$ flows with only the positive component of a difference signal of the waveform shown in FIG. 6(B). These transistors T3 and T4, together with resistors R23 and R24, a diode D7, and capacitors C1 and C2 constitute a control signal conversion circuit. THe control response characteristic of this conversion circuit is preset to rise relatively gently and to recover or fall gently. Both the rising time and the falling time are set at, for example, a number of hundreds of milliseconds (m.sec.). The positive component signal $b$ of the difference signal is fed to this conversion circuit and is converted into a voltage control signal having the above mentioned characteristic. The converted control signal is thereafter supplied through a gate diode D8 to the common control signal forming circuit 73.

The input stage of this common control signal forming circuit 73 includes a control signal conversion circuit comprising resistors R25 and R26, and a capacitor C3. In this conversion circuit, the capacitance of the capacitor C3 is set at a low value, and the resistance value of the resistor 26 is set at a high value.

When the positive signal component $a$, indicated in FIG. 6(A), of the high-frequency band component of the sum signal attains a high level in the time interval of $t_1$ to $t_2$, the transistor T$_1$ switches ON, and the transistor T$_2$ switches OFF. At this time, the collector potential of the transistor T$_2$ rises instantaneously to the power source voltage $(+V_{IX})$ in accordance with a charging characteristic determined by the capacitor C3 and the resistor R20. The resistance value of the resistor R25 is very low and therefore negligible. Then, when the signal $a$ assumes a low level at the time $t_2$ to $t_3$, the transistor T$_1$ switches OFF, and the transistor T$_2$ switches ON. Consequently, the diode D6 is reverse biased, and the charge in the capacitor C3 is discharged through the resistor R26. Since the resistance value of the resistor R26 is high, the discharging time constant of the capacitor C3 is large.

Accordingly, at the junction between the cathode of the diode D6 and the capacitor C3, a control signal $m$ of a waveform, as indicated in FIG. 6(C), is obtained in accordance with the above mentioned signal component $a$. The steep and abrupt characteristic of this control signal $m$ is determined by the resistor R20 and the capacitor C3. The gentle falling characteristic is determined by the resistor R26 and the capacitor C3.

When, the level of the positive signal component $b$, as indicated in FIG. 6(B), of the difference signal becomes very small or zero during the time intervals $t_1$ to $t_2$ and $t_3$ to $t_4$, the transistors $T_3$ and $T_4$ both switch OFF. As a consequence, the diode D7 assumes its conductive state, whereupon the capacitor C1 is charged through the resistor R23, while the capacitor C2 is charged through the resistor R23 and the diode D7. This charging characteristic is relatively large. Then, when the above mentioned signal component $b$ attains a high level in the time interval $t_2$ to $t_3$, the transistors $T_3$ and $T_4$ both switch ON. Consequently, the diode D7 is reverse biased and non-conductive. The capacitor C1 is discharged through the transistors $T_3$ and $T_4$. In addition, the capacitor C2 is discharged in a relatively gentle manner through the resistor R24 and the transistors $T_3$ and $T_4$.

As a consequence, on the cathode side of the diode D8, a control signal $n$ is obtained in accordance with the level of the above-mentioned signal component $b$. This control signal $n$ has a waveform as indicated in FIG. 6(D) wherein both the rising characteristic and the falling or recovering characteristic are relatively gentle.

Consequently, at a junction 86 between the diode D8 and the capacitor C3, a common control signal $o$ is obtained. As indicated in FIG. 6(E), this common control signal $o$ has a waveform of abruptly steep rising characteristic and a gentle falling characteristic when the signal component $a$ has a level which is higher than the specific level. Signal $o$ has a gentle rising and falling characteristic when the signal component $b$ is of a very low level or zero level.

This control signal $o$ is passed through an amplifier 82, where its level is adjusted by variable resistors VR5 and VR6. The signal is phase inverted and amplified by inversion amplifiers 83a and 83b whose gains are adjusted by variable resistors VR7 and VR8. Thereafter, the signal is supplied respectively to the level control circuits 16a and 16b.

Since these level control circuits 16a and 16b have identical circuits, the following description will be directed to only the level control circuit 16a, and description of the level control circuit 16b will be omitted.

The level control circuit 16a is constituted by an inversion-amplification circuit comprising: resistors R1a (resistance value R1) and R2a (resistance value R2); an operation amplifier 84a; an electronic attenuator circuit (voltage controlled variable gain amplification circuit) comprising resistors R3a through R6a (resistance values R3 through R6, respectively), R8a (resistance value R8), R9a (resistance value R9); a field effect transistor (FET) R7a (resistance R7 between drain and source); and an operation amplifier 85a.

An angle-modulated wave difference signal arriving from the angle modulator 15a enters through the input terminal 50a. Then it passes through the resistor R1a, and it is inverted and amplified by the amplifier 84a. Thereafter, this signal is divided by the voltage divider resistors R3a and R4a and supplied to the non-inversion input terminal of the amplifier 85a. At the same time, it is divided by the voltage divider resistor R5a and the resistance R7 of the FET R7a. The signal is then supplied to the inversion input terminal of the amplifier 85a. The amplifier 85 operates as a non-inversion amplifier.

The control signal $o$ sent from the control signal wave forming circuit 73 through the resistor R9a is superimposed on the angle-modulated wave signal divided in voltage by the resistors R8a and R9a and sent from the amplifier 84a. Then it is applied to the gate of the FET R7a. The resistance R7a of the FET R7a is controllably varied by this superimposed signal.

The transfer function G of the above mentioned electronic attenuator circuit is expressed by the following equation:

$$G = -\frac{R6}{R5} + \frac{R4}{R3+R4}\left(\frac{R5+R6}{R5} + \frac{R6}{R7}\right)$$

Furthermore, the resistance R7 of the FET R7a is expressed by:

$$R7 = \frac{r_{DS}}{1 - \frac{V_{GS}}{V_p}},$$

where: $V_{GS}$ is the voltage (control voltage) between the gate and source of the FET R7a; $V_p$ is the pinch-off voltage; and $r_{DS}$ is the resistance (internal resistance) between the drain and source of the FET R7a when $V_{GS}$ is zero. Therefore, if the relationships that R3 >> R4, $r_{DS}$ = R4, and R3 = R5 are set, the above mentioned transfer function G is expressed by:

$$G = \left(-\frac{R6}{R5}\right)\left(\frac{V_{GS}}{V_p}\right)$$

Furthermore, when a signal voltage which is one-half of the voltage $V_{DS}$ between the drain and source is applied between the gate and source of an FET, the nonlinear characteristic of the FET is greatly improved. Accordingly, when the resistance values of the resistors R4a and R9a are R4 = R9, the resistance value R8 of the resistor R8a is represented by R8 = 2R3 + R4. By thus setting these resistance values, the waveform distortion in the electronic attenuator circuit can be reduced to a degree which can be neglected. Furthermore, by setting R3>> R4, the $V_{DS}$ itself of the FET becomes very small, and the distortion factor can be reduced even further.

Therefore, the angle-modulated wave difference signals are introduced through the input terminals 50a and 50b to the level control circuits 16a and 16b. The levels of these signals are controlled by the above mentioned control signal $o$. The resulting signals $p$ have a level waveform, as indicated in FIG. 6(F), at the output terminals 54a and 54b. As clearly understood with reference to FIGS. 6(A), 6(B), and 6(F), the output signal $p$ has a waveform with a characteristic wherein the waveform rises abruptly when the level of at least one sum signal of the first and second sum signals becomes higher than the first specific level. The characteristic falls gently when the level of at least one sum signal becomes lower than the first specific level. Besides the output signal p has a waveform of a characteristic wherein the waveform rises gently when the level of at least one difference signal becomes lower than the other specific level, which level is smaller than the above described specific level. Signal p falls gently when the level of at least one difference signal becomes higher than the other specific level.

Further, this invention is not limited to these embodiments. Many various variations and modifications may be made without departing from the scope and spirit of the invention.

What is claimed is:

1. A multichannel record disc recording system comprising:
    means for supplying first, second, third, and fourth channel signals;
    operation means for forming a first sum signal and a first difference signal responsive to the first and second channel signals and forming a second sum signal and a second difference signal responsive to the third and fourth channel signals;
    means for angle modulating the first and second difference signals;
    control signal forming means for forming a control signal responsive to detection of a condition wherein the level of at least one of the first and second sum signals is higher than a first specific level and a condition wherein the level of at least one of the first and second sum signals is lower than a second specific level, said second specific level being lower than the first specific level;
    control means responsive to said control signal for increasing the levels of the angle-modulated first and second difference signals;
    mixing for multiplexing the first sum signal and the first level controlled angle-modulated difference signal to produce a first multiplexed signal and for multiplexing the second sum signal and the second level controlled angle-modulated difference signal to produce a second multiplexed signal; and
    recording means for cutting and recording the first and second multiplexed signals in a groove of a record disc.

2. A multichannel record disc recording system as claimed in claim 1 in which the control signal forming means comprises: first and second level detection means for respectively detecting when the levels of the first and second sum signals are higher than the first specific level and for producing an output signal responsive thereto; a first NAND gate means for NAND gating the outputs of the first and second level detection means; third and fourth level detection means for respectively detecting when the levels of the first and second sum signals are lower than the second specific level and for producing an output signal responsive thereto; a second NAND gate means for NAND gating the outputs of the third and fourth level detection means; and a third NAND gate means for NAND gating the outputs of the first and second NAND gate means.

3. A multichannel record disc recording system as claimed in claim 2 in which the first and second level detection means comprise high frequency level detection means for detecting when the levels of the high-frequency band components of the first and second sum signals are higher than the first specific level.

4. A multichannel record disc recording system comprising:
    means for supplying first, second, third, and fourth channel signals;
    operation means for forming a first sum signal and a first difference signal responsive to the first and second channel signals and forming a second sum signal and a second difference signal responsive to the third and fourth channel signals;
    means for angle modulating the first and second difference signals;
    control signal forming means for forming a control signal responsive to a detection of a first condition wherein the level of at least one of the first and second sum signals is higher than a first specific level and a second condition wherein the levels of the first and second sum signals are lower than a second specific level, said second specific level being lower than the first specific level, and when the level of at least one of the first and second difference signals is lower than a third level which is relatively low;
    control means responsive to the control signal for controlling the levels of the angle-modulated first and second difference signals;
    mixing means for multiplexing the first sum signal and the first level controlled angle-modulated difference signal to produce a first multiplexed signal and for multiplexing the second sum signal and the second level controlled angle-modulated difference signal to produce a second multiplexed signal; and
    recording means for cutting and recording the first and second multiplexed signals in a groove of a record disc.

5. A multichannel record disc recording system as claimed in claim 4 in which the control signal forming means comprises: a first control signal forming means for forming a first control signal responsive to said sum signal upon the detection of the first condition wheren the level of at least one of the first and second sum signals is higher than the first specific level; a second control signal forming means for forming a second control signal responsive to a detection of the second condition wherein the levels of the first and second sum signals are lower than the level of the second specific level and the level of at least one of the first and second difference signals is lower than the level of the third level; and means for obtaining a control signal from the first and second control signals for controlling the level control means.

6. A multichannel record disc recording system as claimed in claim 5, in which the first control signal has a waveform of a characteristic wherein the waveform rises abruptly when the level of at least one sum signal of the first and second sum signals becomes higher than the first specific level, and the waveform falls gently when the level of said at least one sum signal becomes lower than the first specific level, and in which the second control signal has a waveform of a characteristic wherein the waveform rises gently when the level of at least one difference signal of the first and second difference signals becomes lower than the third level, and the waveform falls gently when the level of said at least one difference signal becomes higher than the third level.

* * * * *